United States Patent [19]

Hara

[11] Patent Number: 4,967,125
[45] Date of Patent: Oct. 30, 1990

[54] TOOL POSTURE CONTROL METHOD FOR A ROBOT

[75] Inventor: Ryuichi Hara, Yamanashi, Japan

[73] Assignee: Fanuc Ltd., Yamanashi, Japan

[21] Appl. No.: 432,747

[22] PCT Filed: Mar. 9, 1989

[86] PCT No.: PCT/JP89/00262

§ 371 Date: Oct. 25, 1989

§ 102(e) Date: Oct. 25, 1989

[87] PCT Pub. No.: WO89/08878

PCT Pub. Date: Sep. 21, 1989

[30] Foreign Application Priority Data

Mar. 10, 1988 [JP] Japan ................. 63-54835

[51] Int. Cl.$^5$ ......................................... G05B 19/415
[52] U.S. Cl. ................... 318/568.11; 318/572; 318/573; 364/513; 364/474.31
[58] Field of Search ................ 318/560–640; 364/513, 188–194; 901/3, 9, 12, 18–24

[56] References Cited

U.S. PATENT DOCUMENTS

| | | |
|---|---|---|
| 4,517,653 | 5/1985 | Tsuchihashi et al. ...... 318/568.14 X |
| 4,521,721 | 6/1985 | Kinoshita ............................ 318/573 |
| 4,635,206 | 1/1987 | Bhatia et al. ............... 318/568.11 X |
| 4,771,222 | 9/1988 | Nakashima et al. ................ 318/572 |
| 4,835,710 | 5/1989 | Schnelle et al. ................ 318/568.11 |
| 4,858,140 | 8/1989 | Buhler et al. ................... 364/474.31 |
| 4,868,473 | 9/1989 | Kato ............................... 364/513 X |
| 4,922,440 | 5/1990 | Kawamura et al. ............ 364/192 X |

Primary Examiner—William M. Shoop, Jr.
Assistant Examiner—Paul Ip
Attorney, Agent, or Firm—Staas & Halsey

[57] ABSTRACT

A tool posture control method for a robot is provided, which is capable of always controlling the posture of a tool as intended, between a starting point and an ending point of operation, in moving the tool from the starting point toward the ending point along a straight line or a circular arc. Based on positions and postures of the tool at a starting point and an ending point, previously given to the robot for instruction, and a tool position at an intermediate point, additionally given as required for instruction, a control device calculates (S2) a first angle formed between the tool and a datum plane, at the starting point, a second angle formed between the tool projected on the datum plane and a datum line set on the datum plane, at the startingt point, and the rotational position of the tool at the starting point around a tool axis, and then calculates (S3) the first angle, the second angle, and the rotational position around the tool axis, at the ending point. Thereafter, the control device interpolates (S4) the tool position, the first angle, the second angle, and the rotational position around the tool axis, between the starting and ending points, and distributes (S6) pulses to servo circuits for driving servomotors, in accordance with the result of the interpolation, thereby controlling the position and posture of the tool between the starting and ending points.

7 Claims, 4 Drawing Sheets

TOOL POSTURE CONTROL METHOD FOR A ROBOT

TECHNICAL FIELD

The present invention relates to a tool posture control method for a robot.

BACKGROUND ART

Conventionally known is a robot of a type in which the pose (position and posture) of a tool attached to a robot hand is controlled for required operation. For example, an articulated robot is known which comprises an arm consisting of a series of links connected to one another for relative rotation and a hand connected to the distal end of the arms so that the hand and hence the tool can assume any desired postures within a three-dimensional space. The robot is previously instructed for the positions of a starting point and an ending point of operation and postures of the tool at the starting and ending points. In operation, interpolation is executed on the basis of these instruction data, whereby the pose of the tool is controlled from the starting point to the ending point.

In linearly moving the tool from the starting point toward the ending point, for example, the robot calculates two parameters $\alpha 1$ and $\alpha 2$ shown in FIG. 5, in accordance with the instruction postures at the starting and ending points. In FIG. 5, symbols V1 and V2 designate approach vectors indicative of the directions of the tool at the starting point P1 and the ending point P2, respectively, and symbol V1' designates a vector obtained by moving the vector V1 in parallel relation such that the starting point of the vector V1 coincides with the ending point P2. The parameter $\alpha 1$ represents an angle (variation of the tool direction from the starting point to the ending point) formed between the vectors V1' and V2 within the plane which contains these two vectors, while the parameter $\alpha 2$ represents the variation of the rotational position of the tool around the axis thereof, between the starting and ending points. The robot linearly interpolates these parameters $\alpha 1$ and $\alpha 2$ between the starting and ending points P1 and P2, thereby controlling the posture of the tool. It is difficult, however, to control the tool posture as intended by this method.

Further, in moving the tool from the starting point P1 to the ending point P2 along a circular arc 2, as shown in FIG. 6, the robot is instructed for the respective positions of the starting and ending points and an intermediate point P3 and the postures of the tool at the starting and ending points. During the operation, the tool position is controlled so that the path of transfer of the tool coincides with the circular arc 2, and the tool posture is controlled by the method described with reference to FIG. 5. Thus, in moving the tool along a circular arc, especially a major arc, the tool posture control is more difficult than in linearly moving the tool.

DISCLOSURE OF THE INVENTION

The object of the present invention is to provide a tool posture control method for a robot, which is capable of controlling the posture of a tool as intended, even in the course of movement of the tool from a starting point toward an ending point.

In order to achieve the above object, a tool posture control method according to the present invention comprises steps of: (a) instructing beforehand a robot for tool positions at a starting point and an ending point of operation and postures of the tool at the starting and ending points; (b) calculating, in accordance with the result of the instruction, a first angle formed between the tool and a datum plane, at the starting point, a second angle formed between the tool projected on the datum plane and a datum line set on the datum plane, at the starting point, and a rotational position of the tool at the starting point around a tool axis; (c) calculating the first angle, the second angle, and the rotational position around the tool axis, at the ending point, in accordance with the instruction result; (d) interpolating the tool position, the first angle, the second angle, and the rotational position around the tool axis, between the starting and ending points; and (e) controlling the posture of the tool in accordance with the result of the interpolation.

According to the present invention, as described above, the respective values, at the starting and ending points of operation, of the first angle formed between the tool and the datum plane, the second angle formed between the tool projected on the datum plane and the datum line set on the datum plane, and the rotational position of the tool around the tool axis are calculated in accordance with the previously taught positions and postures of the tool at the starting and ending points, and further, the first angle, the second angle, and the rotational position around the tool axis are interpolated between the starting and ending points. In moving the tool along a straight line or a circular arc, therefore, the tool posture can always be controlled as intended, between the starting and ending points.

BEST MODE OF CARRYING OUT THE INVENTION

Figure 1:
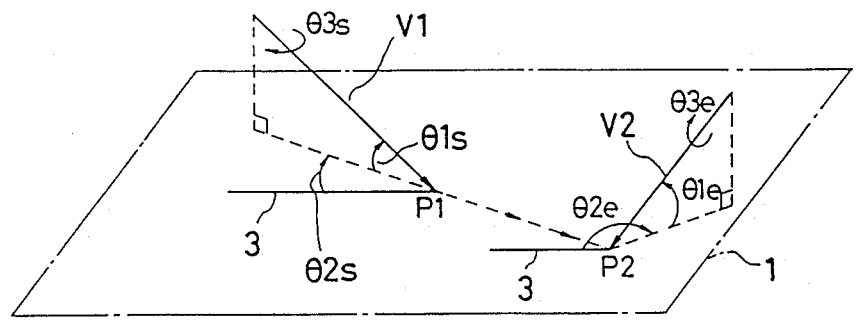
FIG. 1 is a schematic perspective view showing various control parameters in a tool posture control method according to an embodiment of the present invention, in which a tool is linearly moved.
Figure 2:
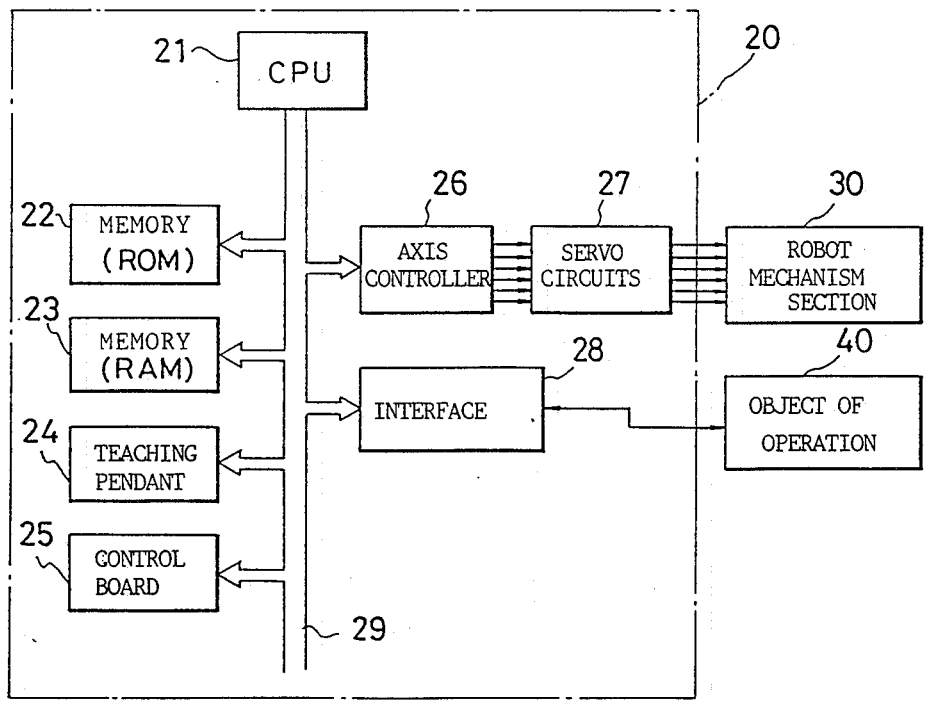
FIG. 2 is a block diagram of a principle part, illustrating, by way of example, a robot to which the method of the present invention is applied.

Referring now to FIG. 2, a robot, which is constructed basically in a conventional manner and to which is applied a tool posture or pose control method according to an embodiment of the present invention, comprises a robot mechanism section 30 for performing a required operation for an object 40 of operation and a control device 20 for controlling the same.

Although an illustration will be omitted, the robot mechanism section 30 includes an arm consisting of a series of links connected to one another by means of, for example, joints (revolute axis, screw axis, prismatic axis) for relative rotation and relative linear movement, a hand attached to the distal end of the arms, a necessary number of actuators, e.g., servomotors, each of which is operable to drive a corresponding one of the arms and the hand with respect to one or more associated axes, and various sensors for detecting the operating states (rotational positions of the servomotors for the individual axes) of the individual axes. In the present embodiment, the hand is arranged to be rotatable within a datum plane (mentioned later), rotatable with respect to the datum plane, and further rotatable around the axis of the hand portion. Namely, the hand and a tool (not shown) attached thereto are operable to assume any desired postures at any desired positions within a three-dimensional space, by controlling the operating states of the joints of the individual arms and the aforesaid three rotational positions (hand angles) are controlled.

A central processing unit (hereinafter referred to as CPU) 21 of the control device 20 is connected, by means of busses 29, with a memory 22, which is formed of a ROM and arranged to store a control program, a memory 23, which is formed of a RAM for storing an instruction program (instruction data), a teaching pendant 24 through which instructions are given to the robot, and an operation board 25 through which various commands and the like are entered. Further, the CPU 21 is connected with an axis controller 26 for causing servo circuits 27 to drive the servomotors for the individual axes, and an interface 28 through which signals are transferred between the CPU 21 and various operating sections and the various sensors of the object 40 of operation.

Referring now to FIGS. 1 to 4, tool posture control operation for the robot will be described.

Figure 4:
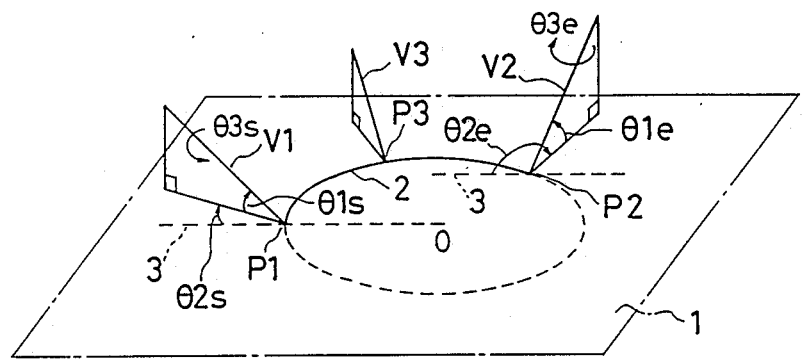
FIG. 4 is a perspective view similar to FIG. 1, showing a case in which the tool is moved along a circular arc.
Figure 5:
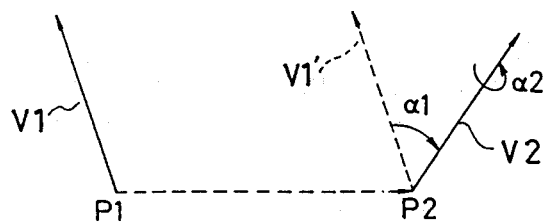
FIG. 5 is a diagram showing control parameters used in a prior art tool posture control method.
Figure 6:
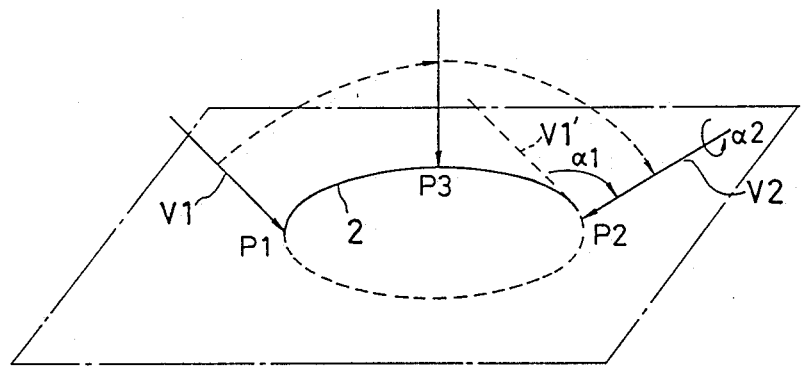
FIG. 6 is a schematic perspective view showing a prior art method in which a tool transfer path is in the form of a circular arc.

Prior to the operation of the robot, an operator operates the teaching pendant 24, thereby locating the tool at a starting point P1 of operation and causing the tool to assume a predetermined posture. In this state, the operator gives the tool an instruction for a pose (tool position and posture) at the starting point, and inputs required instruction words. Consequently, as is conventionally known, instruction data, indicative of the operating states of the individual axes of the robot corresponding to the tool pose at the starting point P1, are stored in the memory 23. A similar instruction is given at an ending point P2 of operation. When the tool is moved along a circular arc 2 (FIG. 4), moreover, an instruction is given for the position of an intermediate point P3 between the starting and ending points. As a result, the instruction program is prepared in the conventional manner, and is stored in the memory 23. In FIG. 4, symbol V3 designates an approach vector which is indicative of the tool direction at the intermediate point P3.

During the operation of the robot, the CPU 21 reads out one back block from the instruction program. Based on instruction coordinate positions (Xs, Ys, Zs) and (Xe, Ye, Ze) of the tool at the starting and ending points P1 and P2, associated with the read block, the CPU 21 determines, at Step S1 of FIG. 3, a datum plane 1 (shown in FIG. 1) passing through both the coordinate positions, and a datum line 3 which is contained in the datum plane 1 and extends parallel to a predetermined coordinate axis, e.g., X-axis. If a tool transfer path designated in the read block is in the form of a circular arc, the CPU 21 sets a line connecting the center O (FIG. 4) of a circular arc 2 and the starting point P1 as the datum line 3.

Then, based on the instruction tool posture at the starting point P1 and the datum plane 1 and the datum line 3 determined in Step S1, the CPU 21 calculates (Step S2) the values of the three hand angles at the starting point P1; the value $\theta 1s$ of an angle (first hand angle) $\theta 1$ formed between the datum plane 1 and an approach vector V1 indicative of the tool direction, the value $\theta 2s$ of an angle (second hand angle) $\theta 2$ formed between the datum line 3 and an approach vector projected on the datum plane 1, and the value $\theta 3s$ of a rotational angle (third hand angle) $\theta 3$ of the tool from a predetermined rotational angle position around the axis of the tool. Likewise, the values $\theta 1e$, $\theta 2e$, and $\theta 3e$ of the hand angles at the ending point are calculated (Step S3) on the basis of the instruction tool posture at the ending point and the like.

Subsequently, the CPU 21 executes interpolation. First, in Step S4, the coordinate position ($Xs+\Delta X$, $Ys+\Delta Y$, $Zs+\Delta Z$) of a first halfway target point on the tool transfer path, which connects the starting and ending points P1 and P2, and the respective values $\theta 1s+\Delta \theta 1$, $\theta 2s+\Delta \theta 2$, and $\theta 3s+\Delta \theta 3$ of the first to third hand angles at the calculated target point are calculated ($\Delta X$ to $\Delta Z$ and $\Delta \theta 1$ to $\Delta \theta 3$ are not shown). Then, in order to change the tool position from the instruction coordinate position (Xs, Ys, Zs) at the starting point P1 to the coordinate position ($Xs+\Delta X$, $Ys+\Delta Y$, $Zs+\Delta Z$) of the target point calculated in Step S4, and to change the individual hand angles $\theta 1$, $\theta 2$, and $\theta 3$ from the values $\theta 1s$, $\theta 2s$, and $\theta 3s$ calculated in Step S2 to the values $\theta 1s+\Delta \theta 1$, $\theta 2s+\Delta \theta 2$, and $\theta 3s+\Delta \theta 3$ calculated in Step S4, the respective variations of the operating states of the joints associated thereto are calculated (Step S5) by a conventional coordinate system transformation method. Then, pulses of a quantity corresponding to the individual variations are distributed to their corresponding servo circuits, so that their corresponding servomotors are driven thereby (Step S6).

Subsequently, the CPU 21 determines (Step S7) whether the processing for the block read out in Step S1 is finished. In this case, the decision in Step S7 is negative, so that the program proceeds to Step S4, whereupon the coordinate position of a second halfway target point on the tool transfer path and the respective values of the first to third hand angles at the calculated target point are calculated. Then, variations of the operating states of the individual joints to move the tool from the first halfway target point to the second halfway target point, and to change the posture of the tool from the one assumed at the first halfway target point to the one assumed at the second halfway target point, are calculated, and pulse distribution is effected in response to the results of the calculation (Steps S5 and S6). Thus, processing of a loop consisting of Steps S4 to S7 is periodically executed, and the tool moves along the predetermined transfer path toward the ending point, while assuming intended postures at the individual halfway target points.

Figure 3:
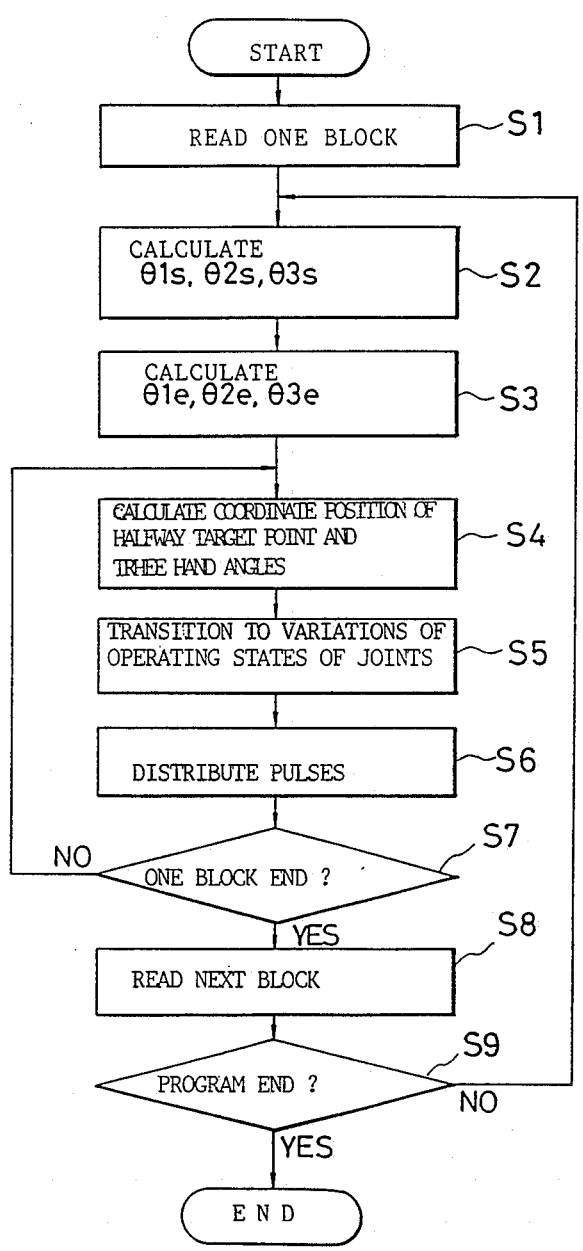
FIG. 3 is a flow chart of a tool posture control program executed by a control device shown in FIG. 2.

When the tool reaches the ending point, thereafter, it is concluded in Step S7 that one block is finished. At this time, the tool assumes an instruction posture expressed by the hand angles $\theta 1e$, $\theta 2e$, and $\theta 3e$, at an instruction end position represented by the coordinate position (Xe, Ye, Ze). Then, the program proceeds to Step S8, whereupon the next block of the instruction program is read out. Whether the program should be finished is determined (Step S9) depending on whether the block thus read out contains a command for the termination of the program. If the program should be continued, the aforesaid processes of Steps S2 to S7 are executed for the block read out in Step S8, thereby controlling the tool pose. If it is concluded in Step S9 that the program should be finished, thereafter, the control operation based on the program of FIG. 3 is finished.

I claim:

1. A tool posture control method for a robot comprising steps of:
   (a) instructing beforehand the robot for tool positions at a starting point and an ending point of operation and postures of said tool at said starting point and said ending point;
   (b) calculating, in accordance with the result of the instruction, a first angle formed between said tool and a datum plane; at said starting point, a second angle formed between said tool projected on said datum plane and a datum line set on said datum plane, at said starting point, and a rotational position of said tool at said starting point around a tool axis;
   (c) calculating said first angle, said second angle, and said rotational position around the tool axis, at said ending point, in accordance with said instruction result;
   (d) interpolating said tool position, said first angle, said second angle, and said rotational position around the tool axis, between said starting point and said ending point; and
   (e) controlling the posture of said tool in accordanced with the result of the interpolation.

2. A tool posture control method for a robot according to a claim 1, wherein said datum plane is set so as to extend through said tool positions at said starting point and said ending point given for instruction in said step (a).

3. A tool posture control method for a robot according to claim 1, wherein said datum line is set so as to extend parallel to a predetermined coordinate axis of a coordinate system used in the instruction for the tool positions in said step (a).

4. A tool posture control method for a robot according to claim 1, wherein an instruction is given for a tool position at an intermediate point between said starting point and said ending point, in sait step (a).

5. A tool posture control method for a robot according to claim 3, wherein an instruction is given for a tool position at an intermediate point between said starting point and said ending point, in said stesp (a).

6. A tool posture control method for a robot according to claim 2, wherein said datum line is set so as to extend parallel to a predetermined coordinate axis of a coordinate system used in the instruction for the tool positions in said step (a).

7. A tool posture control method for a robot according to claim 2, wherein an instruction is given for a tool position at an intermediate point between said starting point and said ending point, in said step (a).

* * * * *